(12) United States Patent
Ferrer Herrera et al.

(10) Patent No.: US 8,704,721 B2
(45) Date of Patent: Apr. 22, 2014

(54) MULTI-AXIAL RESONANT FERRITE CORE ANTENNA

(75) Inventors: Manuel J. Ferrer Herrera, West Bend, WI (US); Elroy W. Shelley, Jr., Brookfield, WI (US)

(73) Assignee: RF Technologies, Inc., Brookfield, WI (US)

( * ) Notice: Subject to any disclaimer, the term of this patent is extended or adjusted under 35 U.S.C. 154(b) by 196 days.

(21) Appl. No.: 13/205,394

(22) Filed: Aug. 8, 2011

(65) Prior Publication Data

US 2013/0038498 A1   Feb. 14, 2013

(51) Int. Cl.
*H01Q 7/08* (2006.01)
(52) U.S. Cl.
USPC .......................................................... 343/788
(58) Field of Classification Search
USPC .................. 343/788, 867, 787, 728, 702, 742
See application file for complete search history.

(56) References Cited

U.S. PATENT DOCUMENTS

| | | | |
|---|---|---|---|
| 3,965,474 A | 6/1976 | Guerrino et al. | |
| 7,042,411 B2 | 5/2006 | Yagi et al. | |
| 7,068,223 B2 | 6/2006 | Yoshida et al. | |
| 7,317,426 B2 | 1/2008 | Copeland et al. | |
| 7,425,929 B2* | 9/2008 | Sako | 343/788 |
| 7,796,091 B2 | 9/2010 | Ueda | |
| 7,994,891 B2* | 8/2011 | Wedley | 336/212 |
| 8,310,331 B2* | 11/2012 | Wedley | 336/212 |
| 2009/0045954 A1* | 2/2009 | Hall et al. | 340/568.1 |
| 2009/0302847 A1 | 12/2009 | Knizhnik | |

* cited by examiner

*Primary Examiner* — Huedung Mancuso
(74) *Attorney, Agent, or Firm* — Foley & Lardner LLP (57) ABSTRACT

An antenna system for use with very low frequency or low frequency RF tags include a plurality of ferrite core coils disposed at an angle with respect to each other. The antenna system further includes a secondary coil disposed around at least one of the primary coils. The antenna system can provide a multi-axis antenna including two, three, or more than three antenna elements. The antenna system can be disposed in a gang box for a less aesthetically intrusive installation.

20 Claims, 8 Drawing Sheets

MULTI-AXIAL RESONANT FERRITE CORE ANTENNA

BACKGROUND

The present disclosure generally relates to the field of antennas. The present disclosure relates more specifically to antennas for use with radio frequency (RF) tag systems, such as, infant/patient monitoring and security RF tag systems.

RF tags include but are not limited to RF identification (RFID) tags and infant/patient monitoring and security RF tags. RF tags transmit and/or receive ultra high frequency (UHF), low frequency (LF), very low frequency (VLF) signals via an antenna. RF tags are usually portable in nature and by design have a small form-factor. Therefore, space allocated for antennas (e.g., UHF, VLF, and LF antennas) on board the RF tags are limited, and usually only allows for space to deploy a single antenna that favors a single orientation (e.g., along one axis). UHF/VLF/LF antenna performance strongly depends on its relative orientation in many applications. Successfully receiving or detecting the signals transmitted by the RF tags when a single-axis antenna is used can be challenging because RF tags can assume an arbitrary orientation in space. For example, an infant/patient monitoring and security RF tag can change its orientation when the mother picks up her infant that is lying in its crib.

Conventional antenna systems can include multiple individual antennas (e.g., multiple single-axis antennas) to achieve multi-axial UHF/VLF/LF reception of signals from the RF tag and/or transmission of signals to the RF tag. Installation of such antenna systems are typically inflexible (e.g., different installation methods and installation locations for each antenna system to achieve multi-axial reception), thereby resulting in higher cost and more limitations for implementation. In addition, installation of such antenna systems can be aesthetically invasive. For example, such conventional installations can be noticeable on surfaces of floors, ceilings, walls, doors, etc.

There is a need for a system for or method of improved detection of signals from RF tags in an RF system. There is also a need for an ability to integrate multiple orientations in a single antenna (e.g., a single antenna with multi-axial coverage). There is a need for an antenna system with multi-axial coverage for RF tags. Further, there is a need for a low cost multi-axial antenna, a simultaneously-resonant antenna or a stand-alone resonators to achieve the multi-axial coverage. Yet further, there is a need for a compact, low cost antenna system and an aesthetically pleasing installation. Still further, there is a need for a method of installing an antenna system in a low cost, aesthetically pleasing manner.

SUMMARY

One embodiment relates to an antenna system for use with very low frequency or low frequency RF tag systems. The antenna system includes a plurality of ferrite core coils. Each of the ferrite core coils has a longitudinal axis disposed at an angle with respect to each other. The antenna system further includes a secondary coil disposed around at least one of the primary coils.

Another embodiment relates to a method of installing an antenna system for use with very low frequency or low frequency RF tag system. The method includes providing a multi-axial resonant antenna including a plurality of ferrite coils and a secondary coil. The method further includes disposing the antenna in a box disposed in or on a wall, floor, or ceiling.

Another embodiment relates to an antenna system for use with very low frequency or low frequency RF tag systems. The antenna system includes a plurality of primary coils. The primary coils are disposed to provide reception along a plurality of axes. The antenna system further includes a secondary coil disposed around at least one of the primary coils. The secondary coil is in series and has turns disposed around one of the primary coils. The primary coils are coupled in series with respect to each other.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

One embodiment of the present disclosure relates to an antenna system. The antenna system can be a multi-axial ferrite core antenna system configured to detect signals from an RF tag (e.g., infant/patient monitoring and security RF tag, RFID tag, etc.) or other RF tag. The antenna system includes an antenna having two or three elements such as ferrite core coils that are preferably oriented at the nominal axes that the RF tag may assume during its operation (e.g., oriented on the X, Y, and Z axes, Y and Z axes, X and Z axes or X and Y axes such that the cores are orthogonal to each other in one exemplary embodiment). The antenna system further includes a secondary coil disposed around at least one of the primary coils. Such a configuration allows for improved detection of signals from RF tags and transmission of signals to RF tags in a building in one embodiment. For example, by using antennas with three ferrite cores or antenna elements, the probability of receiving a signal from the RF tag is increased compared to a distributed single axial antenna or multiple single axial antennas. Using the signals, the antenna elements and antenna system may estimate location and orientation of the RF tag and/or person or object associated with the RF tag. Each ferrite core of the antenna includes a primary inductor or coil in one embodiment. A secondary coil or inductor is disposed about the primary coil in one embodiment.

Figure 1:
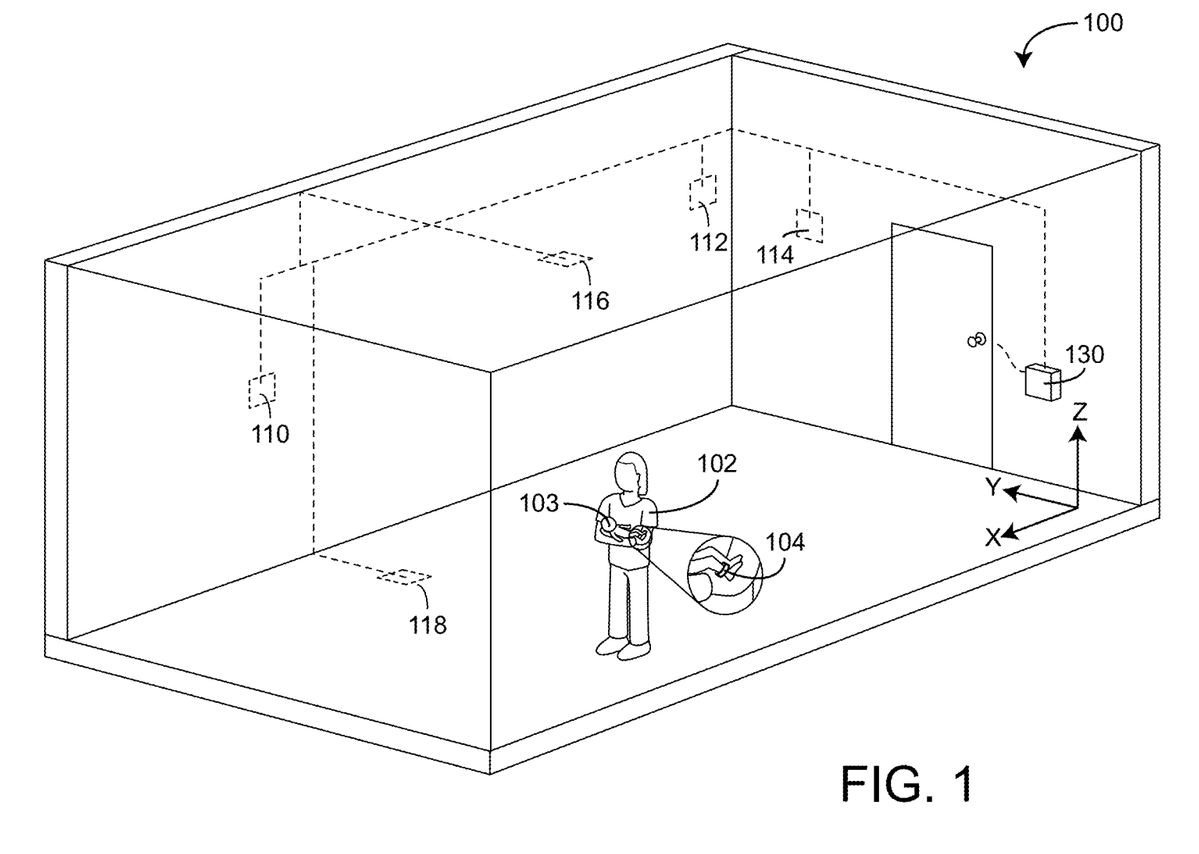
FIG. 1 is a perspective view schematic illustration of an environment for which the antenna systems of the present disclosure may be implemented, according to an exemplary embodiment.

Referring to FIG. 1, an environment (such as a building area 100) includes an RF system for which antenna systems 110, 112, 114, 116, 118 are used according to an exemplary embodiment. Antenna systems 110, 112, 114, 116, 118 may be used in, for example, a security system of a building area 100 (e.g., the antennas may be used to detect RF tags or other RF tags (e.g., RF tag 104) to locate or detect the presence of people or objects (e.g., person 102 holding an infant 103 with RF tag 104 attached to his/her ankle) in a building area. As one example, antenna systems 110, 112, 114, 116, 118 may be used in an infant/patient security system; the antennas in antenna systems 110, 112, 114, 116, 118 are used to detect infants or patients wearing RF tags and may generate an alarm or warning if the location of the infant or patient determined using the RF tag, indicates a problem (e.g., nearby a secured entrance/exit, etc.). For example, in a hospital, infants wearing RF tags may be tracked by antenna systems 110, 112, 114, 116, 118 (or by a central system in communication with systems 110, 112, 114, 116, 118) so that infants are not removed from a particular area. Further, a security system coupled to or in communication with antenna systems 110, 112, 114, 116, 118 may be configured to, for example, lock doors or provide other security measures if unexpected or undesired RF tag movement or location is detected. In certain embodiments, only one antenna system 110, 112, 114, 116 or 118 is necessary for operations in area 100. While the embodiments of FIG. 1. and the present disclosure describe the antenna system for use in a building area or an infant/patient security system, it should be understood that the antenna system described herein may be used in various environments where RF tag tracking or other RF tag tracking (of either people or objects) is desired.

The deployment of systems 110, 112, 114, 116 and 118 in FIG. 1 is exemplary. Systems 110, 112, 114, 116 and 118 can be deployed individually or in various combinations with each other. Systems 110, 112, 114, 116 and 118 can be deployed in a myriad of different configurations without departing from the scope of the invention.

In the embodiment of FIG. 1, person 102 is shown holding an infant 103 with an RF tag 104 attached to the infant's ankle (the location of RF tag 104 on infant 103 may vary according to various exemplary embodiments). RF tag 104 can be an RFID tag, a security RF tag, or other device for communicating with antenna systems 110, 112, 114, 116, 118. Various antenna systems 110, 112, 114, 116, 118 may be located throughout building area 100 (e.g., a room, multiple rooms, a floor, an outside area, or another defined area in a building). Antenna systems 110, 112, 114, 116, 118 may be housed in a box or other container (e.g., a gang box); while FIG. 1 shows antenna systems 110, 112, 114, 116, 118 generally disposed at various locations in area 100, it should be understood that the antenna systems are preferably attached to a gang box or other structure disposed in a wall, ceiling, or floor. Antenna systems 110, 112, 114, 116, 118 may include antennas having two, three, or more coils disposed about ferrite cores as described in the present disclosure and are configured to detect a signal from the RF tag (e.g., an RF signal emitted by the antenna of RF tag 104 during a wireless transmission of RF tag 104). The ferrite cores preferably each have longitudinal axes being disposed at an angle with respect to each other. Using the signal, antenna systems 110, 112, 114, 116, 118 may be able to detect person 102 and infant 103 movement and/or person 102 and infant 103 location in addition to the actual detection of the presence of person 102 and infant 103. Antenna systems 110, 112, 114, 116, 118 are located in the walls of building area 100 (e.g., surface-mounted on the wall or embedded inside the wall). Antenna systems 110, 112, 114, 116, 118 may further be located in a ceiling like antenna system 116 (e.g., above the ceiling, embedded into the ceiling, mounted on the ceiling), in a floor like antenna system 118 (e.g., embedded into the floor, below the floor, or even buried in the ground below the floor), near a door (e.g., such that upon detection of a signal by a door antenna system, the door may be secured), or another area of building area 100. Further, antenna systems 110-118 may be coupled to a pivoting mechanism that allows for orienting the antenna axes relative to the fixed position of the pivoting mechanism. Since antenna systems 110-118 generally include at least two antenna elements disposed at two different axes, antenna systems 110-118 may be configured to detect RF tag 104 regardless of the orientation of one element in the building area. In a preferred embodiment, antenna systems 110, 112, 114, 116, 118 each include three antenna elements disposed at three different orientations. The size of the antenna elements may be scaled or varied to larger or smaller sizes as required for the building area 100 or other area in which the antennas elements are installed. Further, the use of multiple antenna elements may help prevent impacting the aesthetics of the walls or medium where they are installed. For instance, instead of multiple single-axis antennas disposed in different locations (each antenna favoring a particular axis) in the walls or medium where they are installed, the multiple antenna elements are disposed in a single location (e.g., in an electrical gang box), reducing impact on the aesthetics of the walls or the medium where they are installed.

Antenna systems 110-118 are shown coupled to or in communication with a controller 130. Controller 130 may include its own antenna system similar to one of systems 110, 112, 114, 116, 118. Controller 130 is configured to receive and process RF tag signal information (e.g., identification, location, or movement information). Controller 130 may also be configured to transmit information to RF tag 104 or to a central computer. Controller 130 may include a security protocol for providing security measures based location or movement of person 102 and infant 103, and may include a locator system for locating and tracking person 102. For example, controller 130 can be configured to lock or open doors in area 100 in response to LF or VLF signals from RF tag 104. Controller 130 is shown within building area 100, according to various embodiments. Controller 130 may be located remotely from building area 100 and may be a part of a larger security system or other system for the building area.

Figure 2:
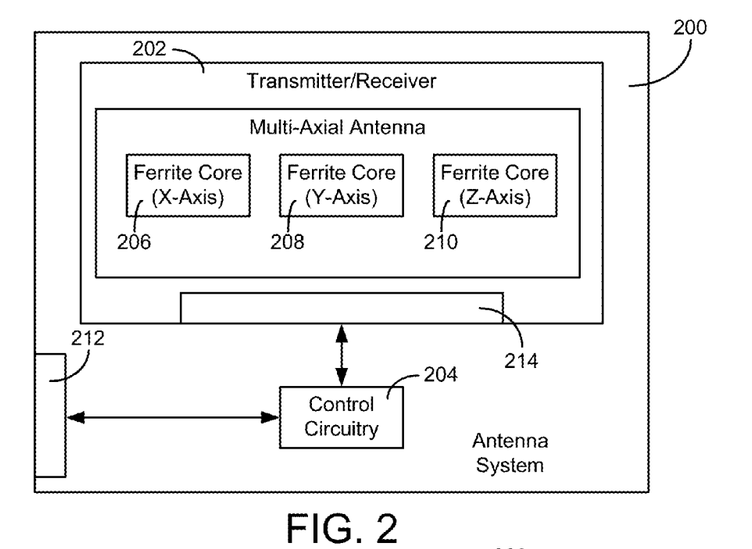
FIG. 2 is a general block diagram of an antenna system for the environment illustrated in FIG. 1 including an antenna with multiple elements or cores, according to an exemplary embodiment.

Referring now to FIG. 2, a block diagram of antenna system 200 is shown, according to an exemplary embodiment. Antenna system 200 can be used as any of, for example, antenna systems 110-118 of FIG. 1. Antenna system 200 includes a transmitter/receiver 202 and control circuitry 204.

Transmitter/receiver 202 is configured to detect RF tag signals and provide signal information to control circuitry 204 via interface 214. Control circuitry 204 is configured to receive the signal information and provide the signal information to a controller via an interface 212. Control circuitry 204 may further be configured to determine RF tag information or other information using the signal information and may transmit such information via interface 212. For example, control circuitry 204 may include sensors (e.g., Hall sensors, current sensors, etc.) to measure a magnetic flux magnitude generated in each axis of antenna system 200, and the resultant sensor readings may be used to estimate location of or direction to, RF tag 104. For example, the Hall sensor measures a Hall voltage created when a voltage and magnetic field are applied. The Hall sensor measures a different voltage level depending on the strength of the magnetic field in each direction or axis. For example, if the sensors indicate that the orientation of one of the coils is being favored and the other two are not, the RF tag is determined to have the same orientation as the first coil.

Transmitter/receiver 202 preferably includes an antenna including three antenna elements 206, 208, 210. Each element or component 206, 208, 210 is aligned in a different direction (e.g., each element 206, 208, 210 and its respective ferrite core 207, 209, 211 may be aligned with one of an X, Y, or Z axis). It should be understood that transmitter/receiver 202 may include two antenna elements or more than three antenna elements instead of three antenna elements without departing from the scope of the present invention. Antenna elements 206, 208, and 210 can be orthogonal to each other in one embodiment. Antenna elements 206, 208, and 210 can have air cores, ferrite cores, plastic cores, etc.

Figure 3:
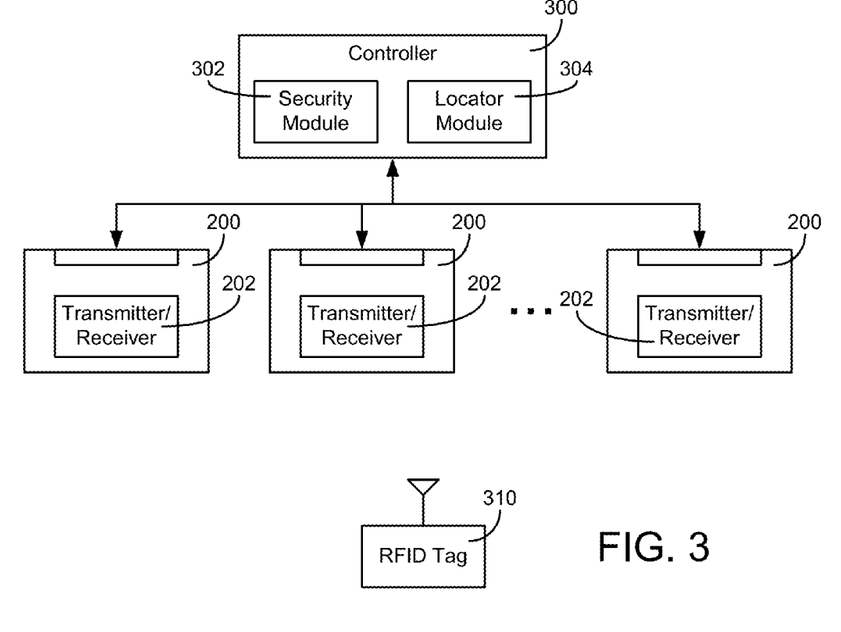
FIG. 3 is a general block diagram of an RF tag system including the antenna system illustrated in FIG. 2, according to an exemplary embodiment.

Referring now to FIG. 3, antenna systems 200 are coupled to a controller 300. Antenna systems 200 include transmitter/receivers 202 configured to detect signals from RF tag 310. Controller 300 is configured to receive signal information from antenna systems 200 and use the signal information for various building area systems. For example, security module 302 may be included in controller 300 and may be configured to provide security measures (e.g., locking or unlocking doors, providing an alert or warning based on RF tag location or movement) for the building area. As another example, locator module 304 may receive the signal information and determine the location of the RF tag at a given time. For example, the strength of signal at each direction or axis may be used by locator module 304 to determine the location of the RF tag. According to various embodiments, modules 302, 304, and other modules that use the signal information may be included in controller 300, may be coupled to controller 300 and/or antenna systems 200, or may be included in one or more antenna systems 200.

Figure 4:
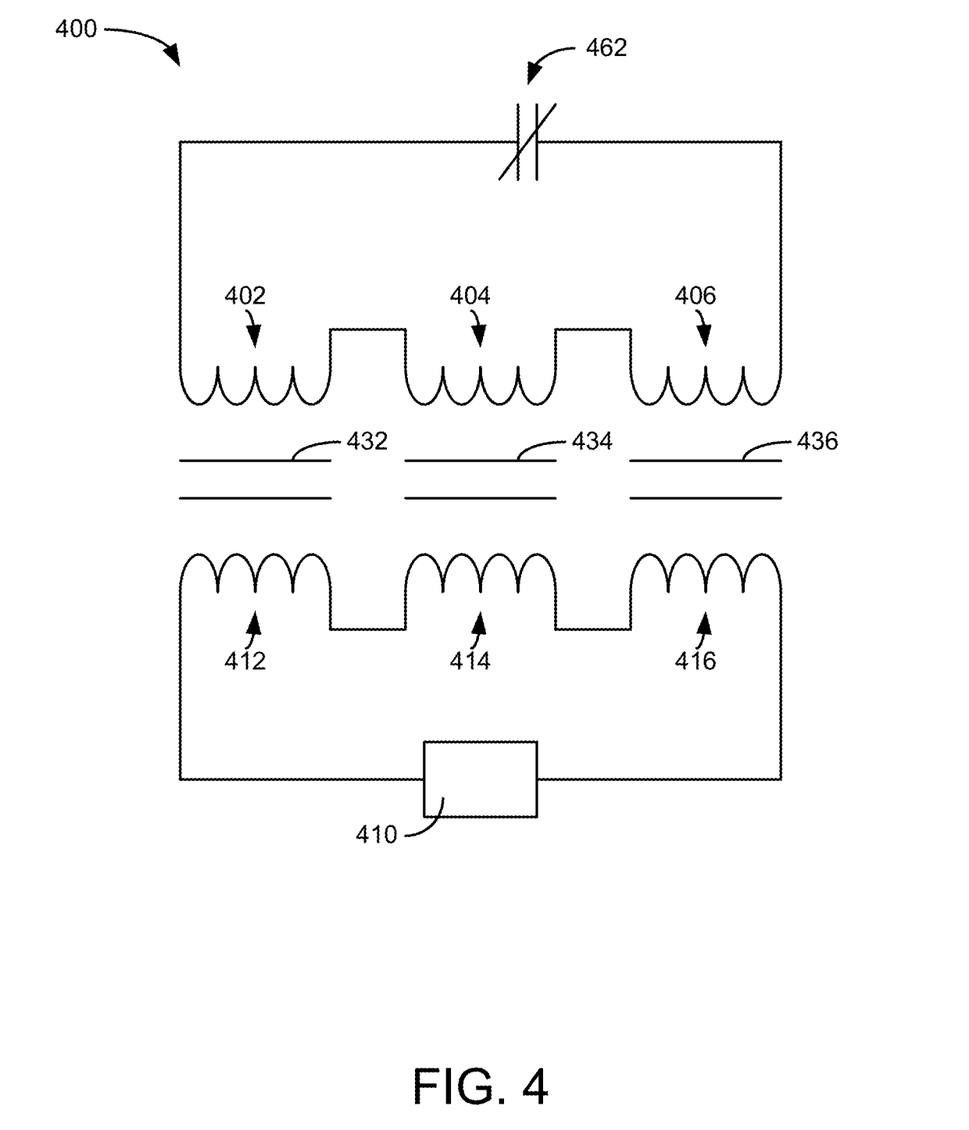
FIG. 4 is an electrical schematic illustration of the antenna illustrated in FIG. 2, according to an exemplary embodiment.
Figure 5:
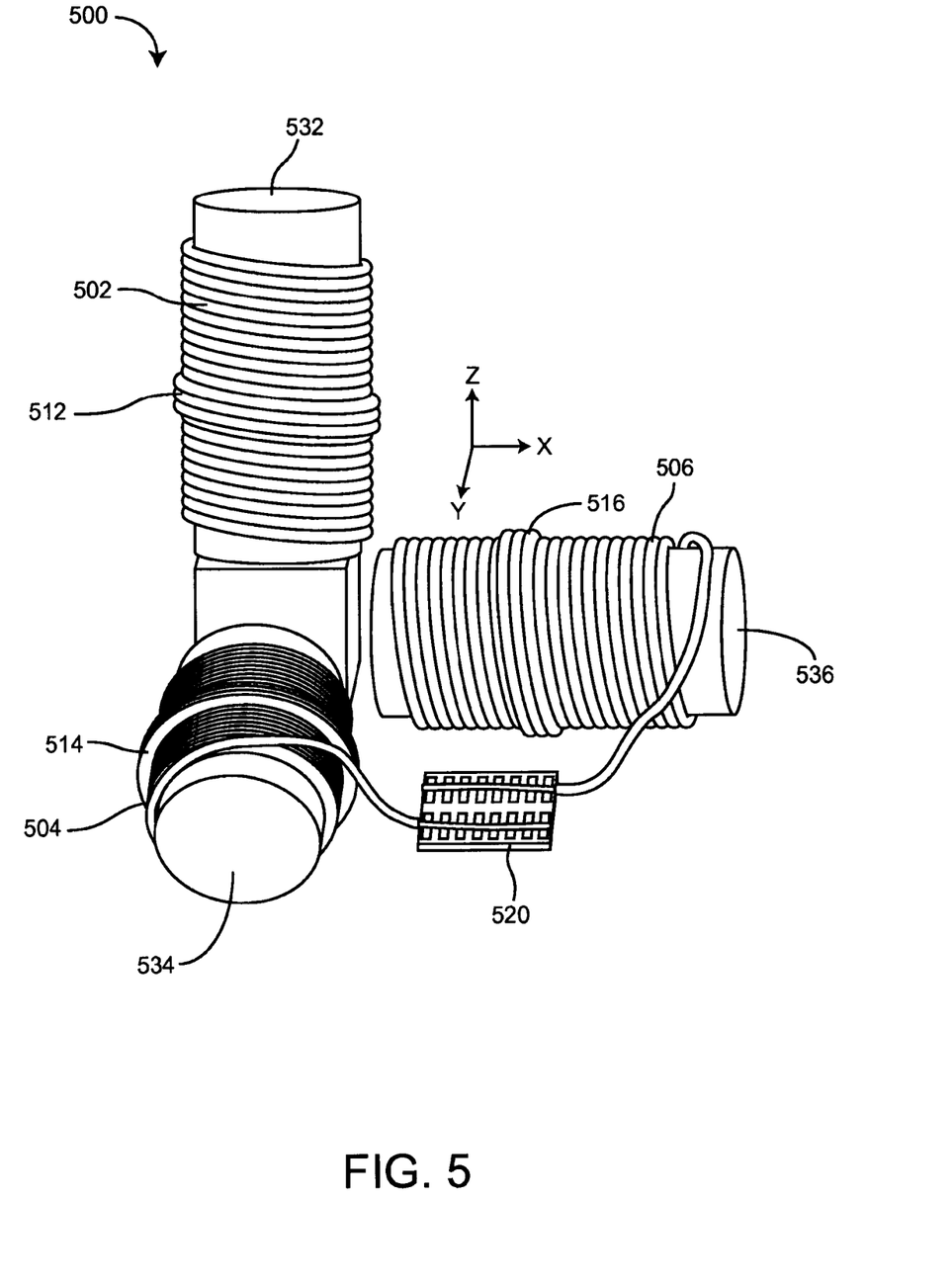
FIG. 5 is a perspective view illustration of one embodiment of the antenna illustrated in FIG. 2, according to an exemplary embodiment.

Referring generally to FIG. 4 and FIGS. 5-9, various embodiments of the antenna system of the present disclosure are shown. Referring more specifically to FIG. 4, antenna system 400 generally includes primary inductors, coils, or windings 402, 404, 406 and a secondary inductor, coil or windings 412, 414, and 416. Secondary inductors 414 and 416 each have an end connected to a circuit board 410. A capacitor 462 can be coupled to the primary inductors 402, 404, 406 (e.g., capacitor 462 is coupled between an end of each of primary inductors 402 and 406) as described below. Capacitor 462 preferably has a variable or adjustable capacitance for tuning the resonance of the antenna. Antenna system 400 further includes sensors (e.g., Hall sensors as described in FIG. 2) that are disposed across primary inductors 402, 404, 406.

In the embodiment of FIG. 4, the primary inductors or coils 402, 404, 406 are in series. Secondary inductors 412, 414 and 416 may be disposed about respective primary coils 402, 404, 406 or may not be disposed around one of the primary coils. Inductors 412, 414 and 416 can be coupled in series. Each respective pair of primary inductors 402, 404 and 406 and secondary inductors 412, 414 and 416 form one axis of the multi-axis antenna. Although described as separate primary inductors 402, 404 and 406 and separate secondary inductors 412, 414 and 416, primary inductors 402, 404 and 406 and secondary inductors 412, 414 and 416 can be considered components of a single multi-axis antenna sharing a single primary inductor and a single secondary inductor disposed across multiple axes.

Referring further to FIGS. 4-9, the antenna system is a multi-axial ferrite core antenna system including at least two orthogonal (or oblique) axes or elements according to preferred embodiments. For example, antenna systems 500, 600, 700 include three ferrite cores and antennas 800, 900 include two ferrite cores. Each antenna axis (e.g., longitudinal axis) includes a primary inductor and a secondary inductor. The primary inductor may be formed by winding one wire around each axis of the ferrite cores. For example, in the schematic illustration of FIG. 4, the primary inductor is wound around each of the ferrite cores 432, 434 and 436. The primary inductor is used to build a tunable LC (inductor-capacitor) circuit capable of resonating at different frequencies. The primary conductor (L) is fixed in value; the value is determined by the number of wire turns around the ferrite core of the antenna, the separation between the wire turns, and the ferrite core material and dimensions. The capacitor (C) (e.g., the capacitor of antenna system 400) may be made variable such that resonance is achieved at a specific frequency in a preferred embodiment. The variable capacitor can be a varactor diode, a single turn trim capacitor, or a multiple turn trim capacitor in certain embodiments.

The secondary inductor or coil of each antenna core or axis is also formed by winding one wire around the ferrite core on top of the already wound primary inductor (e.g., disposed around the primary inductor or ferrite core coils). The secondary inductor (e.g., secondary inductors 412, 414 and 416 shown in FIG. 4) may be referred to as a "pick-up" magnetic flux loop, as its function is to pick-up, through magnetic coupling with the primary inductor and subsequently inducting, a current to be detected by a receiver circuit. The secondary inductor or coil is a single conductor. According to various embodiments, the secondary inductor may not be required to be made resonant, but can be made resonant if the receiver circuit needs such a requirement. The secondary inductor affects the net inductance of the primary inductor; therefore, the secondary inductor is considered when determining the variable capacitor (C) value range to properly build the tunable LC circuit in one embodiment.

Although each orthogonal ferrite core in the antenna behaves as an independent antenna, the primary and secondary inductors are continuously wound around each of the ferrite cores, so the wire-winding is common to each antenna system element.

The ends of the secondary inductor (e.g., secondary inductor 416) are connected to a receiver/detector or other control circuit. When the antenna system is excited (with a transmitted wireless signal) by a portable RF tag, infant/patient monitoring and security RF tag, or other RF tag transmitting at the same frequency as the resonant LC circuit, a peaked response is obtained at the receiver and the detection of the RF tag is successfully achieved.

The ferrite cores of FIGS. 5-9 are shown perpendicular to each other (e.g., for any combination of two coils, there is a 90 degree angle formed between the coils), in a preferred embodiment, thereby reducing the chance that the coils will couple and change the resonant frequency.

Referring more specifically to FIGS. 5-9, various embodiments of the antenna system are shown in greater detail. For example, antenna system 500 of FIG. 5 includes three ferrite cores 532, 534, 536, and a circuit board 520. Circuit 520 can house a variable capacitor for resonating primary inductors associated with cores 532, 534 and 536. Ferrite cores 532, 534, 536 of antenna system 500 may have a length of two inches and a 0.845 inch diameter. Cores 532, 534 and 536 are wrapped by respective primary inductors 502, 504 and 506 and secondary inductors 512, 514 and 516. Antenna system 600 of FIG. 6 includes three ferrite cores 604, 606, 608, and a circuit board 602. Board 602 can house a variable capacitor for resonating primary inductors associated with cores 604, 606 and 608. Ferrite cores 604, 606, 608 of antenna system 600, however, may be more compact, having a length of one inch and a one inch diameter. Antenna system 700 of FIG. 7 includes three ferrite cores 704, 706, 708, and a circuit board 702. Board 702 can house a variable capacitor for resonating primary inductors associated with cores 704, 706 and 708. Ferrite cores 704, 706, 708 of FIG. 7 may have a length of one inch and a 0.845 inch diameter.

Figure 6:
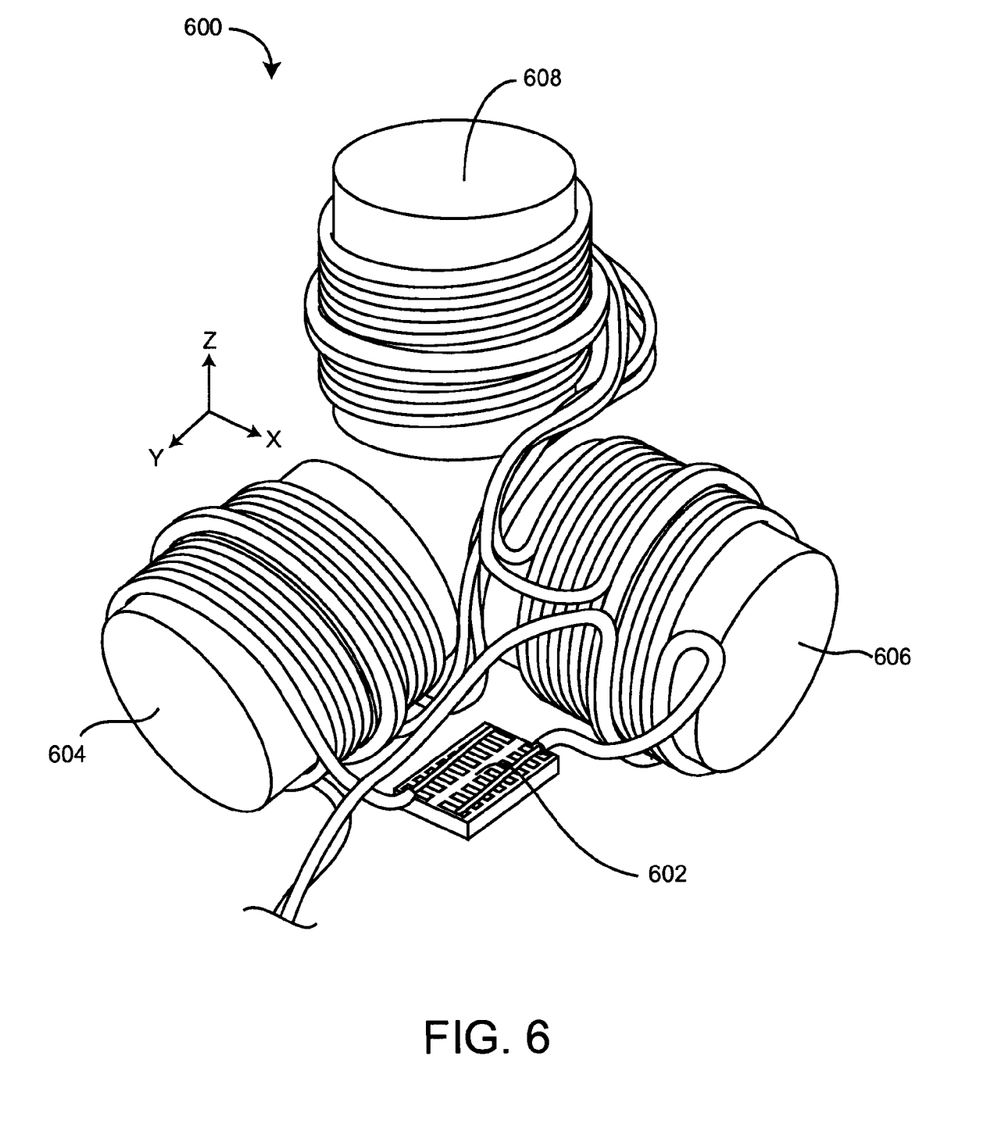
FIG. 6 is a perspective view illustration of one embodiment of the antenna illustrated in FIG. 2, according to another exemplary embodiment.
Figure 7:
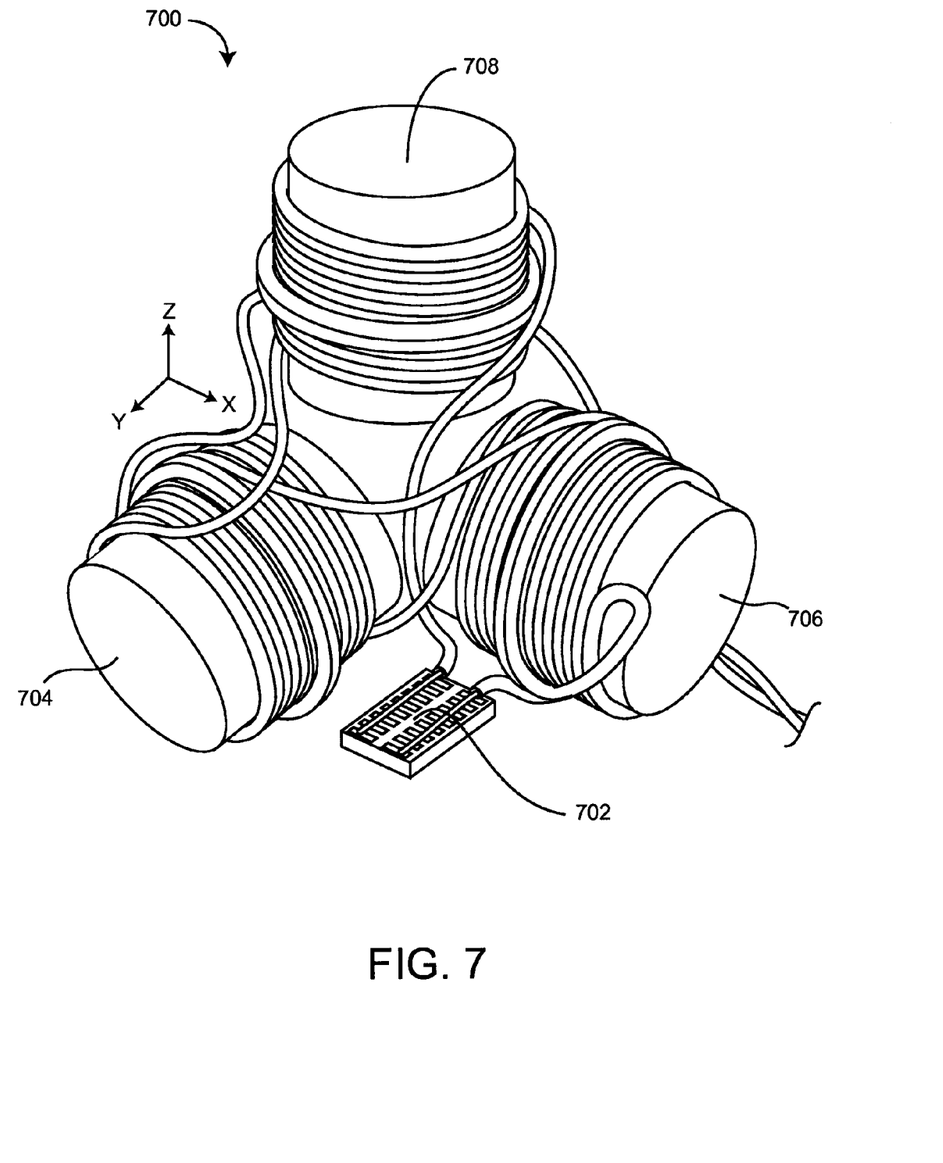
FIG. 7 is perspective view illustration of one embodiment of the antenna illustrated in FIG. 2, according to yet another exemplary embodiment.

Referring more specifically to FIG. 6, the winding of the wires around the ferrite cores for each axis is shown in greater detail. In the embodiment of FIG. 6, a first wire (e.g., primary inductor) starts at the left of circuit board 602, is wrapped around a first ferrite core (e.g., ferrite core 604 in the Y-axis), then the second and third ferrite cores (cores 608, 606, respectively), then reaches the right portion of circuit board 602. Antenna system 600 further includes a second wire that traverses the same path as the first wire. However, instead of being connected to circuit board 602, the second wire is connected to a receiver/detector (e.g., controller 410 of FIG. 4). The second wire is the pick-up loop or secondary inductor of antenna system 600. According to an exemplary embodiment, ferrite cores 604, 606, 608 share the same circuit board 602 and the same receiver/detector. The primary coils of ferrite cores 604, 606, 608 may have between 10 and 30 turns, according to other embodiments; the number of turns may vary. In one embodiment, the secondary coils of cores 604, 606 and 608 have 1 to 2 turns. Other embodiments can use a different number of turns for primary and secondary coils.

Figure 8:
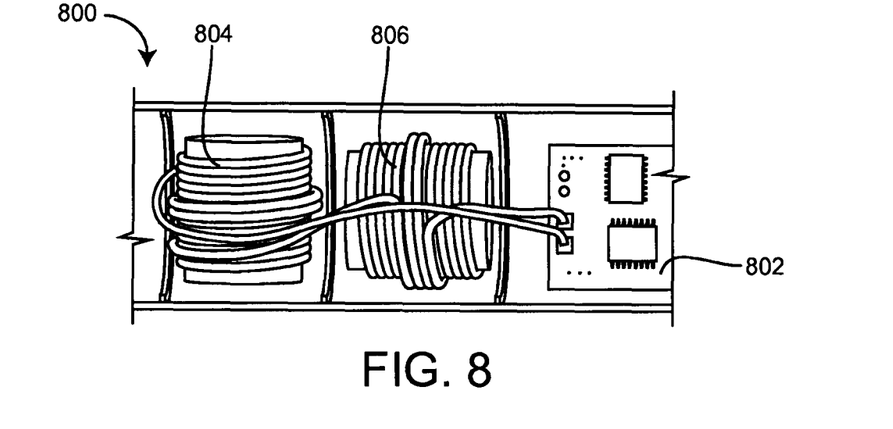
FIG. 8 is a perspective view illustration of one embodiment of an antenna for the environment of FIG. 1, according to yet another exemplary embodiment.

Referring now to FIG. 8, antenna system 800 includes two elements disposed on two axis according to an exemplary embodiment. Antenna system 800 includes circuit board 802 and ferrite cores 804, 806. Board 802 can house circuitry for detecting RF signals received by antenna system 800 and performing location and security functions. Board 802 can also house a variable capacitor for resonating primary inductors associated with cores 804 and 806. Ferrite cores 804, 806 may have a length of one inch, and a diameter of 0.845 inches, and antenna system 800 is configured to be arranged in a plastic box or other frame for installation. The frame is configured to hold the ferrite core coils in position orthogonal to each other, according to an exemplary embodiment. While two-axis and three-axis embodiments are shown in the figures, it should be understood that four axis embodiments and further may be used without departing from the scope of the present disclosure.

Referring generally to FIGS. 5-8, the reception range of the antennas may be varied. For example, lower or higher ranges may be obtained by selecting different ferrite core materials, different primary to secondary turns ratios; ranges may be affected by the frequency of operation of the antenna, the output power of the antenna, receiver sensitivity, and other parameters of the antenna, etc. According to one exemplary embodiment, the antenna may be installed in a building area and is configured to have a reception range of ten feet.

In another embodiment, a stand-alone resonator may be used in conjunction with a single-axis ferrite core antenna, proving an alternative method to achieve a multi-axial antenna. A stand-alone resonator is a resonant LC circuit (previously described in the disclosure) including a primary inductor (L) and a variable capacitor (C) that facilitates tuning of the circuit to a specific resonant frequency to the extent of the variable capacitor range. Alternatively, the stand-alone resonator can be built utilizing a plurality of other methods (e.g., non-ferrite cores, air cores, dielectric cores, etc.). In addition, a multitude of geometrical shapes can be utilized (e.g., square, circular, hexagonal, planar, etc.). The stand-alone resonator does not require the use of a pick-up loop or secondary inductor.

Figure 9:
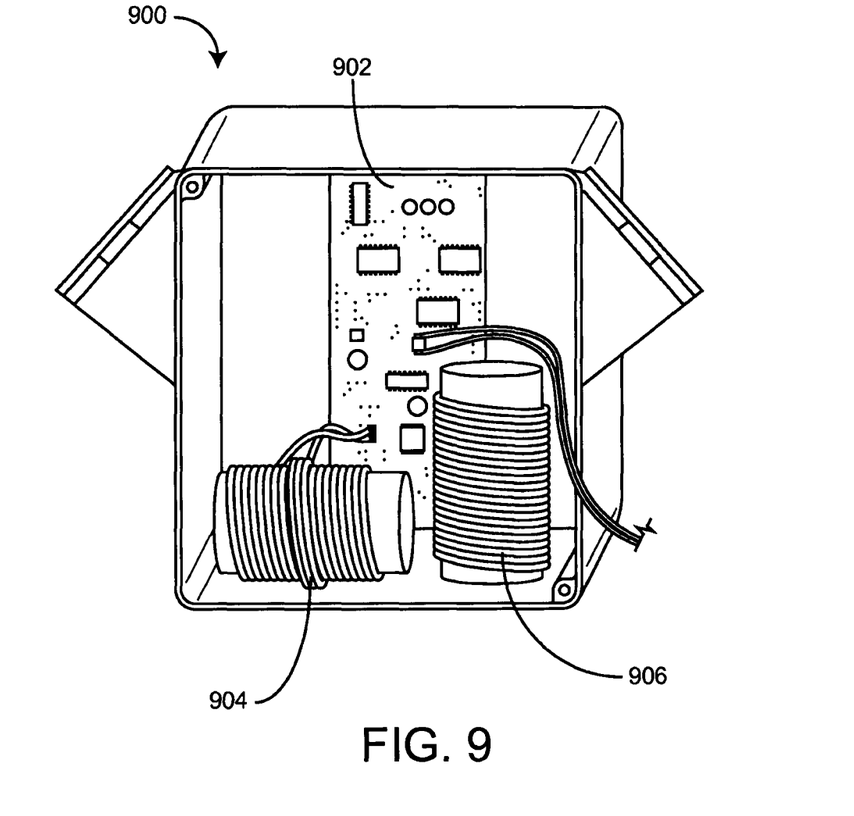
FIG. 9 is a perspective view illustration of one embodiment of the antenna for the environment of FIG. 1, according to yet another exemplary embodiment.

The single-axis ferrite core antenna is made of the same elements as described above with reference to FIGS. 5-8 (e.g., a primary inductor that forms an LC resonant circuit and a secondary inductor winding on a common ferrite core). In order to increase the number of effective axes to the single-axis antenna, one or more orthogonal or oblique stand-alone resonators are tightly placed next to the single-axis antenna. Referring now to FIG. 9, an embodiment of the single-axis ferrite core antenna is shown in greater detail. Antenna system 900 includes circuit board 902 and ferrite cores 904, 906. Board 902 can house circuitry for detecting RF signals received by antenna system 900 and performing security functions. Board 902 can also house a variable capacitor for resonating primary inductors associated with cores 904 and 906. The primary coil of core 904 is not directly connected to the primary coil of core 906 in one embodiment. The secondary coil is only disposed about the primary coil around core 904. In the embodiment of FIG. 9, antenna system 900 is shown installed inside a plastic electrical gang box, such as a single, double or triple gang box. Antenna system 900 may be installed in the gang box such that the gang box (and therefore antenna system 900) can be installed in the inside of a wall of a building area. Such a configuration allows for less interference for the antenna system. The gang box can be covered with a plastic cover that matches the color and texture of the installation environment. The use of the gang box provides a standard installation method that minimizes the aesthetic impact to the installation.

While the antenna system of the present disclosure is described with respect to receiving signals, the antenna system may be used as a transmit antenna system. While the various aspects of the antenna system are described with reference to improving and optimizing the ability for signal reception, the antenna system may be configured to be suitable for transmission applications instead of or in addition to reception applications.

According to one exemplary embodiment, the antenna system of the present disclosure may be backwards compatible. For example, if a building area includes a single-axis antenna, the antenna system of the present disclosure may be made compatible with the single-axis antenna system.

According to an exemplary embodiment, the ferrite cores of FIGS. 5-9 may be solid ferrite cores, may be a laminated core, may be coated in plastic, or may be any type of ferrite core of any type of ferrite material. For example, the primary and secondary coils may be a single coated conductor. The type of material used may be varied depending on the application of the antenna system. The wires in the embodiments of FIGS. 5-9 may be copper wire, magnet wire (e.g., copper wire laminated with a non-conductor), etc. The diameter of the ferrite core, the diameter of the wire, and the amount of turns of wire on each ferrite core may be varied in order to affect inductance and range of the antenna system.

Referring further to FIGS. 5-9, the number of turns of primary inductor and secondary inductor over the ferrite cores may be varied. For example, a high ratio between the primary and secondary inductors may be maintained. In FIG. 6, for example, there are only two turns of the secondary inductor and many more turns of the primary inductor. According to an exemplary embodiment, the secondary coil or inductor has at least two turns around each of the primary coils or inductors.

Figure 10:
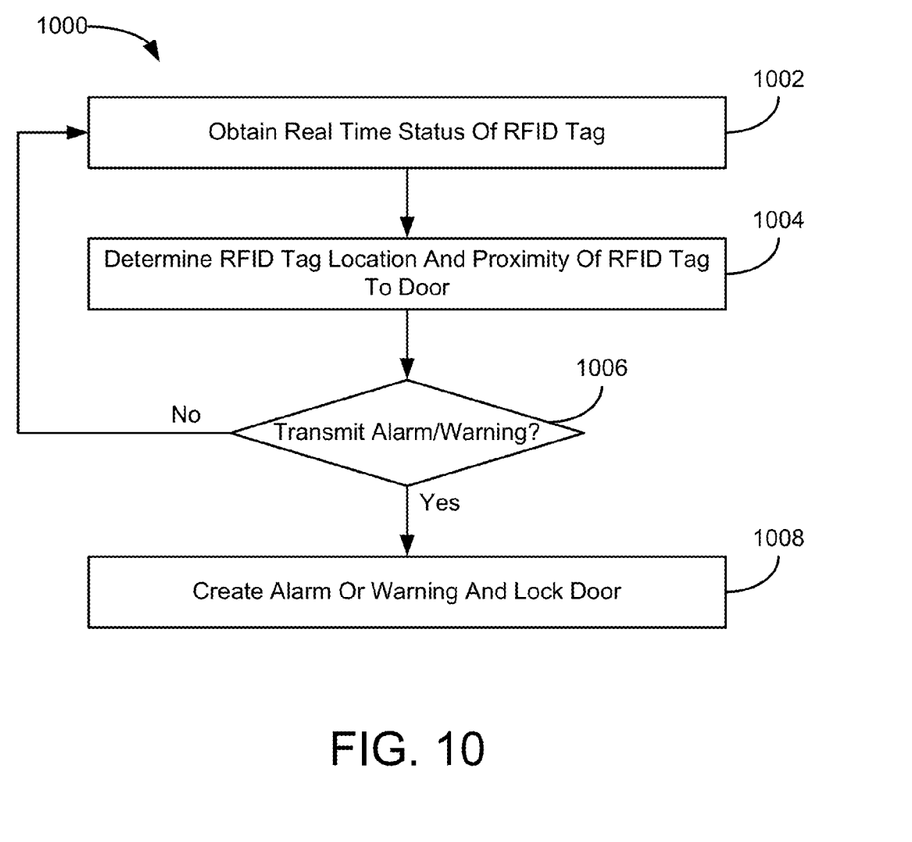
FIG. 10 is a flow chart of a process of using the antenna system in the environment of FIG. 1, according to an exemplary embodiment.

Referring now to FIG. 10, a flow chart of a process 1000 of using the antenna system of the present disclosure is shown, according to an exemplary embodiment. Process 1000 includes obtaining a real time status of an RF tag (step 1002). Step 1002 may include continuously "listening" to or "interrogating" the RF tag such that a real time status of the RF tag is obtained.

Process 1000 further includes determining a location of the RF tag and determining the proximity of the RF tag to a door, elevator, entrance, or other outlet (step 1004). Step 1004 may include using the signal obtained from the RF tag via antenna system 200 to determine a location of the person or asset the RF tag is associated.

Process 1000 further includes determining whether to transmit an alarm or warning based on the RF tag location (step 1006). If so, an alarm may be created and the door may be locked such that the person or asset may not be removed from the area (step 1008).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Further, the orientation or longitudinal axes of the coils can be in any number of configurations. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An antenna system for use with very low frequency or low frequency RF tag systems, the antenna system comprising:
   a plurality of ferrite core primary coils, each of the ferrite core primary coils has a longitudinal axis being at an angle with respect to each other; and
   a secondary coil disposed around at least one of the ferrite core primary coils, wherein the ferrite core primary coils are in series and coupled to a capacitive element to form a resonant circuit and wherein the capacitive element comprises a variable capacitor coupled between an end of one of the ferrite core primary coils and an end of another of the ferrite core primary coils, wherein the variable capacitor is a varactor diode, a multi-turn trim capacitor, or a single turn capacitor.

2. The antenna system of claim 1, further comprising a control circuit coupled to a first end of the secondary coil, wherein the control circuit includes a receiver/transmitter circuit.

3. The antenna system of claim 2, further comprising another secondary coil disposed around one of the ferrite core primary coils.

4. The antenna system of claim 1, further comprising a frame, the frame providing structure for holding three of the ferrite core primary coils orthogonal to each other.

5. The antenna system of claim 1, wherein the antenna system fits within a double gang box.

6. The antenna system of claim 1, wherein the ferrite core primary coils each have between 10 and 30 turns.

7. The antenna system of claim 6, wherein the secondary coil has at least one turn around at least one of the ferrite core primary coils.

8. The antenna system of claim 7, wherein the secondary coil is a single conductor.

9. An antenna system for use with very low frequency or low frequency RF tag systems, the antenna system comprising:
   a plurality of ferrite core primary coils, each of the ferrite core primary coils has a longitudinal axis being at an angle with respect to each other; and
   a secondary coil disposed around at least one of the ferrite core primary coils wherein one of the ferrite core primary coils is a resonant coil, the resonant coil being unconnected to another of the ferrite core primary coils.

10. The antenna system of claim 9, wherein the ferrite core primary coils are in series and coupled to a capacitive element to form a resonant circuit.

11. The antenna system of claim 10, further comprising a Hall effect sensor coupled across each of the ferrite core primary coils.

12. The antenna system of claim 10, wherein the capacitive element comprises a variable capacitor coupled between an end of one of the ferrite core primary coils and an end of another of the ferrite core primary coils, wherein the variable capacitor is a varactor diode, a multi-turn trim capacitor, or a single turn capacitor.

13. The antenna system of claim 10, wherein the secondary coil is disposed about a first portion of one of the primary coils and a second portion disposed about another of the ferrite core primary coils.

14. The antenna system of claim 9, wherein the secondary coil is not disposed around one of the ferrite core primary coils.

15. A method of installing an antenna system for use with very low frequency or low frequency RF tag system, the method comprising:
   providing a multi-axial resonant antenna including a plurality of primary coils and a secondary coil, the primary coils being ferrite core coils, each of the primary coils has a longitudinal axis being at an angle with respect to each other, and the secondary coil being disposed around at least one of the primary coils, wherein one of the primary coils is a resonant coil, the resonant coil being unconnected to another of the primary coils; and disposing the antenna in a box disposed on or in a wall, floor or ceiling.

16. The method of claim 15, wherein the box is a single, double or triple gang box.

17. The method of claim 15, wherein the antenna is coupled to a control circuit.

18. An antenna system for use with very low frequency or low frequency RF tags, the antenna system comprising:
  a plurality of primary ferrite core coils disposed to provide reception along a plurality of axes; and
  a secondary coil disposed around at least one of the primary ferrite core coils, the secondary coil being in series and having at least one turn disposed around one of the primary ferrite core coils, the primary ferrite core coils being electrically coupled in series with respect to each other, wherein the primary coils are coupled in series and coupled to a variable capacitor to form a resonant circuit and wherein the variable capacitor is coupled between an end of one of the primary ferrite core coils and an end of another of the primary ferrite core coils, wherein the variable capacitor is a varactor diode, a multi-turn trim capacitor, or a single turn capacitor.

19. The antenna system of claim 18, further comprising a sensor disposed across each of the primary ferrite core coils.

20. The antenna system of claim 18, wherein the primary ferrite core coils and the secondary coils are each comprised of a single coated conductor, wherein the primary ferrite core coils are orthogonal to each other.

* * * * *